United States Patent
Argue et al.

(10) Patent No.: US 9,171,328 B2
(45) Date of Patent: Oct. 27, 2015

(54) METHOD FOR TRANSFERRING SHOPPING CART CONTENTS TO A REGISTER FROM A MOBILE ELECTRONIC DEVICE

(71) Applicant: Wal-Mart Stores, Inc., Bentonville, AR (US)

(72) Inventors: Stuart Argue, Palo Alto, CA (US); Anthony Emile Marcar, San Francisco, CA (US)

(73) Assignee: WAL-MART STORES, INC., Bentonville, AR (US)

( * ) Notice: Subject to any disclaimer, the term of this patent is extended or adjusted under 35 U.S.C. 154(b) by 399 days.

(21) Appl. No.: 13/723,025

(22) Filed: Dec. 20, 2012

(65) Prior Publication Data

US 2014/0175167 A1    Jun. 26, 2014

(51) Int. Cl.
*G06K 15/00* (2006.01)
*G06Q 30/06* (2012.01)
*G06Q 20/32* (2012.01)

(52) U.S. Cl.
CPC ........ *G06Q 30/0633* (2013.01); *G06Q 20/3274* (2013.01)

(58) Field of Classification Search
USPC .......................... 235/383, 381, 462.1, 462.09; 705/14.38, 16
See application file for complete search history.

(56) References Cited

U.S. PATENT DOCUMENTS

| | | | |
|---|---|---|---|
| 5,595,264 A | 1/1997 | Trotta, Jr. | |
| 5,970,474 A | 10/1999 | LeRoy | |
| 6,115,601 A | 9/2000 | Ferreira | |
| 6,343,276 B1 | 1/2002 | Barnett | |
| 6,937,998 B1 | 8/2005 | Swartz | |
| 7,810,720 B2 | 10/2010 | Lovett | |
| 8,005,426 B2 | 8/2011 | Huomo | |
| 8,346,672 B1 | 1/2013 | Weiner | |
| 8,408,463 B2 | 4/2013 | Narendra | |
| 8,751,316 B1 * | 6/2014 | Fletchall et al. | ................. 705/20 |
| 2004/0238629 A1 * | 12/2004 | Buchholz | ....................... 235/383 |
| 2007/0194123 A1 | 8/2007 | Frantz | |
| 2009/0090783 A1 | 4/2009 | Killian | |
| 2011/0233285 A1 | 9/2011 | Meyer | |
| 2012/0006891 A1 | 1/2012 | Zhou | |
| 2012/0136698 A1 * | 5/2012 | Kent | ............................ 705/14.1 |
| 2012/0226565 A1 | 9/2012 | Drozd | |
| 2013/0097034 A1 | 4/2013 | Royyuru | |
| 2013/0153655 A1 * | 6/2013 | Dawkins | ........................ 235/383 |

* cited by examiner

*Primary Examiner* — Ahshik Kim
(74) *Attorney, Agent, or Firm* — Howard & Howard Attorneys PLLC

(57) ABSTRACT

A method is disclosed for allowing a customer to create a digital shopping cart on a mobile electronic device while shopping at a brick and mortar store. The customer may scan barcodes, e.g. UPC variants, from a product with the camera of the mobile electronic device and record these product barcodes into the mobile electronic device. The shopping cart contents may be transferred to a checkout register without a data connection between the register and the device. The mobile electronic device may create one or more 2D barcodes with the item information embedded into the 2D barcode and may display the barcode on the device screen. Multiple 2D barcodes may be displayed in sequence. The 2D barcode may be scanned at the checkout register to read the barcode and thereby transmit the shopping cart information to the checkout register.

15 Claims, 10 Drawing Sheets

METHOD FOR TRANSFERRING SHOPPING CART CONTENTS TO A REGISTER FROM A MOBILE ELECTRONIC DEVICE

BACKGROUND

1. Field of the Invention

This invention relates to shopping at a retail location and more particularly to an approach for allowing a customer to transfer a list of items for purchase from a mobile electronic device to a register to complete their purchase.

2. Background of the Invention

Many point-of-sale (POS) systems currently in use today do not support important emerging technologies. For example, current POS systems are limited in their ability to handle electronic shopping carts within a local retail store and the associated self-checkout functionality. Accordingly, what is needed is a system and method for facilitating use of electronic devices while shopping at a brick and mortar retail location. As will be seen, the invention provides such an approach in an elegant manner.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the embodiments, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods. Accordingly, a novel approach is provided for allowing customer to use a mobile electronic device to create a shopping cart of products for purchase and to transfer the list of items to a POS terminal to purchase those items.

Figure 1:
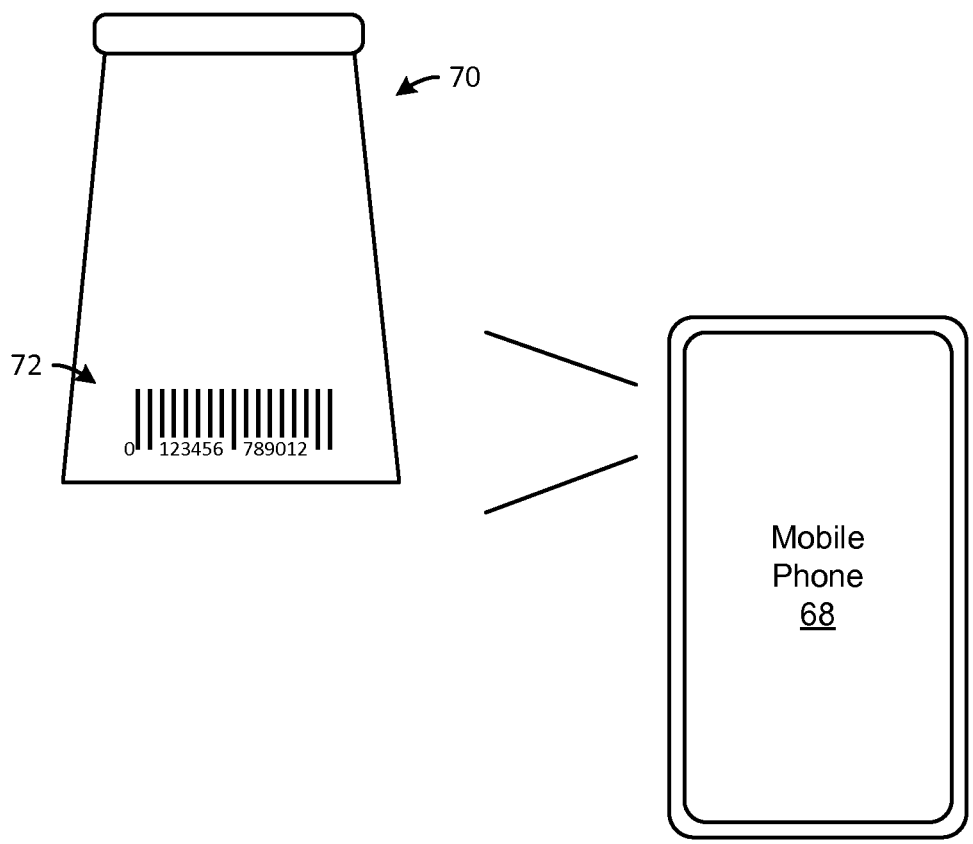
FIG. 1 is a schematic block diagram of a mobile device system.

Referring to FIG. 1, a customer may utilize a mobile electronic device 68, such as a smart phone or tablet computer, while shopping. In particular, the customer may have a mobile electronic device which has mobile self-checkout software loaded thereon. The customer may use the mobile electronic device 68 while shopping. In particular, the customer may use the mobile electronic device to create a shopping cart of items which the customer selects for purchase at a brick and mortar retail store. By way of example, the customer may select an item 70 for purchase and may use the mobile electronic device to scan a UPC code 72 on that item. The mobile self-checkout software on the mobile electronic device may, from the UPC code 72, obtain and store information regarding the product 70. The customer may proceed in this manner while shopping, selecting items for purchase, scanning the UPC code associated with that item, and creating a digital shopping cart on the mobile electronic device 68 which includes a list of items selected for purchase.

Figure 2:
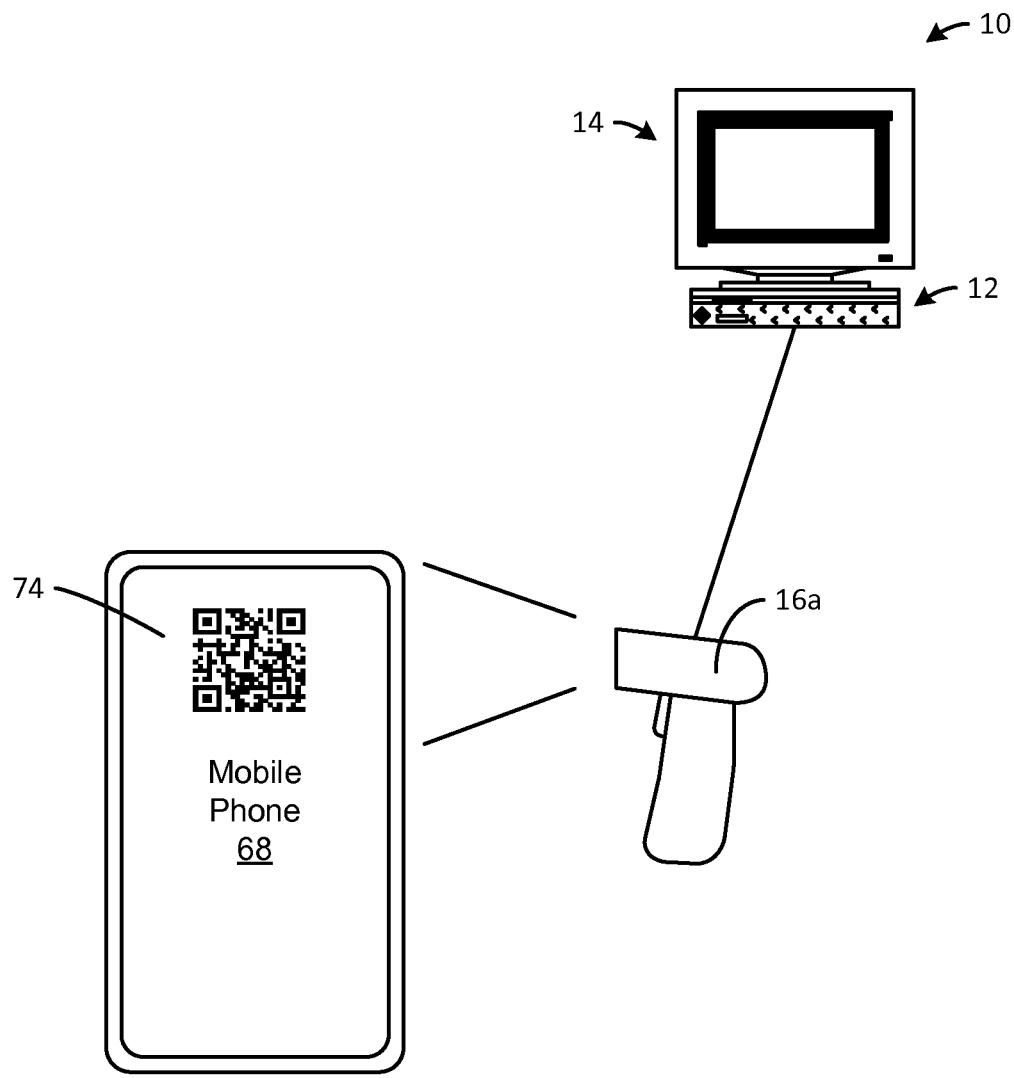
FIG. 2 is a schematic block diagram of a mobile device and point-of-sale (POS) system.

As illustrated in FIG. 2, when the customer is ready to checkout and pay for the selected items, the customer will typically approach a POS terminal 10. The POS terminal 10 may be a self-checkout register or a conventional sales register with a cashier. The customer will typically have a shopping cart or basket with the selected items and will have information about those items on the mobile electronic device. The customer may indicate on the mobile electronic device that they are ready to checkout. In response, the mobile electronic device 68 may prepare information for the POS terminal 10 to convey the list of items for purchase. The mobile electronic device 68 may prepare one or more machine readable codes 74, such as a 2D barcode or QR code, which have information regarding the selected items.

2D machine readable codes can convey significant amounts of information. The machine readable code 74 may be prepared with product information such as the numeric UPC code of the products in the shopping cart embedded in the machine readable code as a payload. If there are too many products to fit within a single machine readable code 74, a series of machine readable codes can be prepared and flashed in sequence as they are acquired by the POS terminal. An optical scanner 16a associated with the POS terminal 10 may be used (either by the customer at a self-checkout lane or by a cashier at an assisted checkout lane) to scan the machine readable code 74 and thereby receive information regarding the selected items for purchase.

The list of items is thus transferred to the POS terminal 10 without requiring all items to be scanned individually at the POS terminal. The customer may thus checkout in an easier manner. The customer may save time while shopping as the checkout process proceeds more quickly. The store may save money as fewer cashiers are necessary to handle the number of customers.

Various parts of a POS system and self-checkout system may allow a customer to scan items into a digital shopping cart while shopping and to transfer those items from a mobile electronic device to a POS terminal. Various parts of a self-checkout system are described to illustrate how these may allow a customer to complete a checkout process. In certain embodiments, a machine-readable code may be used to interact between the customer's mobile electronic device, products, and/or the POS system. The machine readable code may comprise a conventional barcode or a two-dimensional barcode (e.g., a Quick Response (QR) Code). The data encoded within a machine-readable code may vary between different embodiments and different purposes or goals of the embodiment. In selected embodiments, a machine-readable code may encode a product identification code, transaction identification (ID) uniquely identifying a particular transaction (e.g., purchase, return, or the like). Alternatively, or in addition thereto, a machine-readable code may encode data regarding the customer, the POS terminal and/or the store where the terminal is located. A machine readable code may facilitate the installation or use of mobile self-checkout software by the customer or other persons known to the customer. In some embodiments, a machine readable code may be accompanied by an alpha-numeric code.

In general, the purpose of a self-checkout system is to facilitate self-checkout in a manner which is convenient to the customer and which also provides a desired measure of robustness. Many challenges arise in using self-checkout. In particular, the use of self-checkout software to build an electronic shopping cart may create challenges when a network connection to the mobile electronic device is not available. It is desirable to provide a robust connection between the customer's mobile electronic device and the POS terminal. Such a connection may be provided independent of any network connection, allowing the customer to complete their purchase without interruption.

Embodiments in accordance with the invention may be embodied as an apparatus, system, device, method, computer program product, or other entity. Accordingly, the invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of embodiments described herein may be written in any combination of one or more programming languages, including an object-oriented programming language such as Java, Smalltalk, C++, or the like and conventional procedural programming languages, such as the "C" programming language or similar programming languages. The program code may execute entirely on a computer of a point-of-sale (POS) system, partly on a POS computer, as a stand-alone software package, on a stand-alone hardware unit, partly on a remote computer spaced some distance from the POS computer, or entirely on a remote computer or server. In the latter scenario, the remote computer may be connected to the POS computer through any type of network, including a local area network (LAN) or a wide area network (WAN), or the connection may be made to an external computer (e.g., through the Internet using an Internet Service Provider).

Embodiments can also be implemented in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The embodiments are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 3:
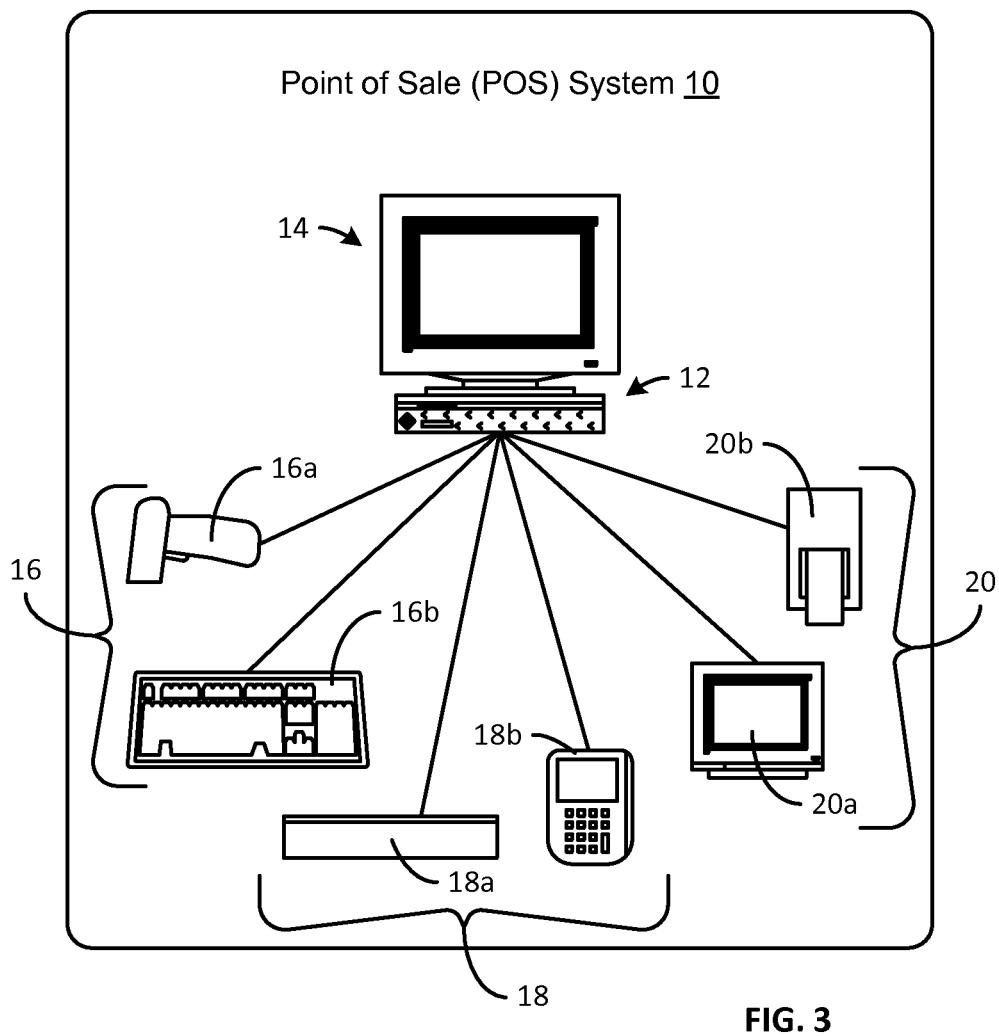
FIG. 3 is a schematic block diagram of one embodiment of a POS system.

Referring to FIG. 3, in selected embodiments, the hardware, software, or hardware and software of a POS system 10 may be configured to implement one or more methods in accordance with embodiments described herein. For example, a POS system 10 may be manufactured, programmed, modified, or upgraded to support providing electronic receipts to customers and to facilitate subsequent management of the receipt. In particular, a POS system may allow a customer to provide receipt information to other persons such as work, an accountant, etc. In discussing the present system, it is appreciated that the system may involve one or more parts of a local POS terminal and associated computers or servers, remote computers or servers, customer devices such as a mobile electronic device, and associated equipment.

A POS system 10 may include various components. In certain embodiments, a POS system 10 may include a central or primary computer 12, a monitor 14 (e.g., a cashier-facing monitor 14), one or more input devices 16 (e.g., scanners 16a, keyboards 16b, scales, or the like), one or more payment devices 18 (e.g., cash drawers 18a, card readers 18b) for receiving or returning payments, one or more output devices 20 (e.g., customer-facing display 20a or monitor 20a, receipt printer 20b), or the like or combinations or sub-combinations thereof.

A computer 12 may form the primary processing unit of a POS system 10. Other components 16, 18, 20 forming part of a POS system 10 may communicate with the computer 12. Input devices 16 and certain payment devices 18 may feed data and commands to a computer 12 for processing or implementation. For example, a scanner 16a may pass data communicating the identity of one or more items to be purchased, returned, or the like to a computer 12. Similarly, a card reader 18b may pass payment information to a computer 12.

Conversely, output devices 20 and certain payment devices 18 may follow or implement commands issued by a computer 12. For example, a cash drawer 18a may open in accordance with the commands of a computer 12. Similarly, a customer-facing display 20a and receipt printer 20b may display or output data or information as instructed by a computer 12.

In selected embodiments, in addition to handling consumer transactions (e.g., purchases, returns), a POS system 10 may also provide or support certain "back office" functionality. For example, a POS system 10 may provide or support inventory control, purchasing, receiving and transferring products, or the like. A POS system 10 may also store sales and customer information for reporting purposes, marketing purposes, receivables management, trend analysis, cost analysis, price analysis, profit analysis, or the like. If desired or necessary, a POS system 10 may include an accounting interface to pass certain information to one or more in-house or independent accounting applications. A POS system 10 may also communicate with third parties and may transmit receipt information and facilitate customer management of receipts.

Figure 4:
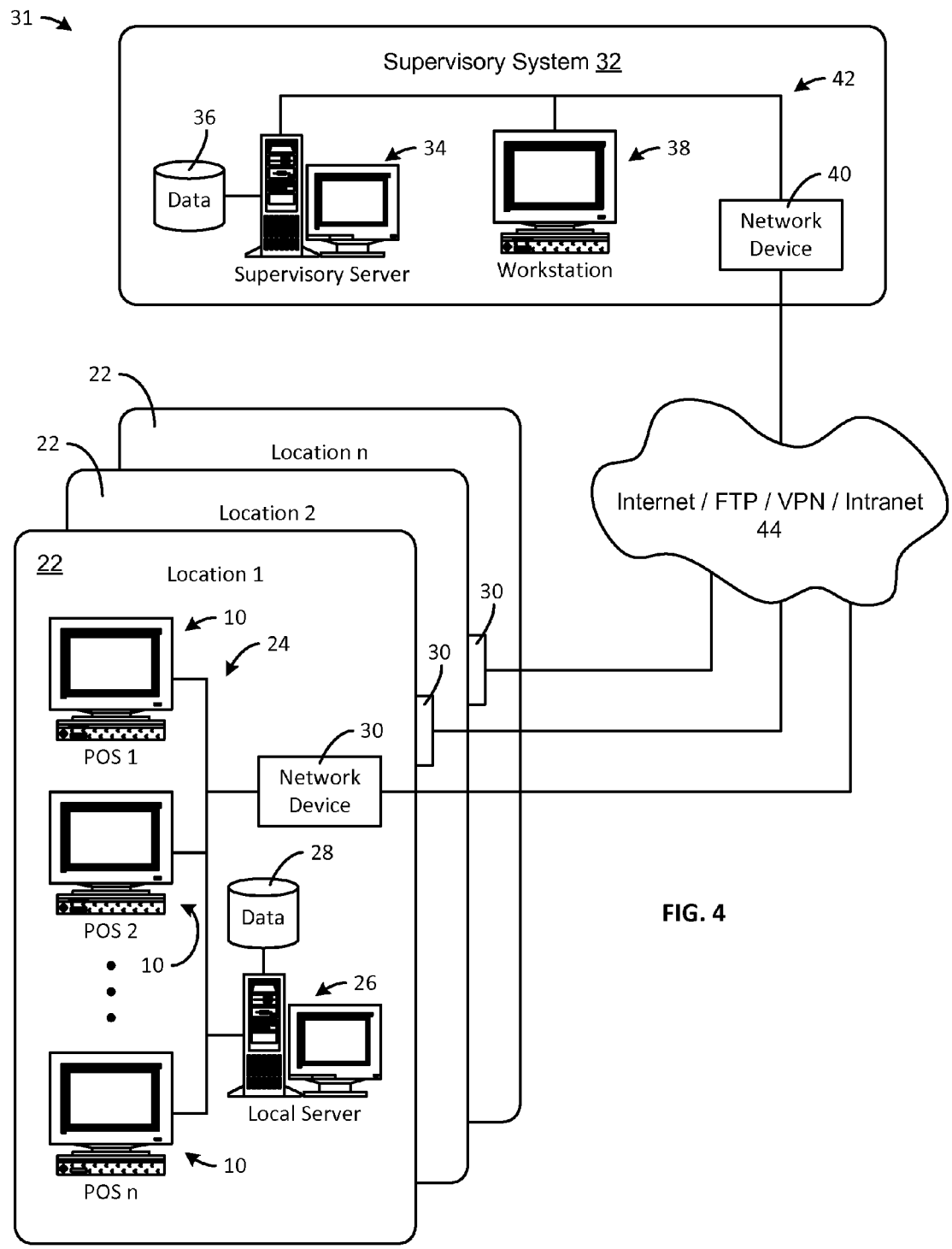
FIG. 4 is a schematic block diagram of one embodiment of multiple POS systems operating in the context of an enterprise-wide system.

Referring to FIG. 4, in selected embodiments, a POS system 10 may operate substantially independently, as a stand-alone unit. Alternately, a POS system 10 may be one of several POS systems 10 forming the front line of a larger system. For example, multiple POS systems 10 may operate at a particular location 22 (e.g., within a retail, brick-and-mortar store). In such embodiments, the various POS systems 10 may be interconnected via a LAN 24. A LAN 24 may also connect the POS systems 10 to a local server 26.

A local server 26 may support the operation of the associated POS systems 10. For example, a server 26 may provide a central repository from which certain data needed by the associated POS systems 10 may be stored, indexed, accessed, or the like. A server 26 may serve certain software to one or more POS systems 10. In certain embodiments, a POS system 10 may offload certain tasks, computations, verifications, or the like to a server 26.

Alternatively, or in addition thereto, a server 26 may support certain back office functionality. For example, a server 26 may receive and compile (e.g., within one or more associated databases 28) data from the various associated POS systems 10 to provide or support inventory control, purchasing, receiving and transferring products, or the like. A server 26 may also receive and compile sales and customer information for reporting purposes, marketing purposes, receivables management, trend analysis, cost analysis, price analysis, profit analysis, or the like.

In certain embodiments, one or more POS systems 10 or servers 26 corresponding to a particular location 22 may communicate with or access one or more remote computers or resources via one or more network devices 30. For example, a network device 30 may enable a POS system 10 to contact outside resources and verify the payment credentials (e.g., credit card information) provided by a customer. A network device 30 may comprise a modem, router, or the like.

In selected embodiments, a POS system 10 may operate within an enterprise-wide system 31 comprising multiple locations 22 (e.g., branches 22 or stores 22). In such embodiments, each location 22 may have one or more POS systems 10, local servers 26, local databases 28, network devices 30, or the like or combinations or sub-combinations thereof connected by a computer network (e.g., a LAN 24). Additionally, each such location 22 may be configured to interact with one or more supervisory systems 32. For example, multiple branch locations 22 may report to an associated "headquarters" location or system 32.

A supervisory system 32 may comprise one or more supervisory servers 34, databases 36, workstations 38, network devices 40, or the like or combinations or sub-combinations thereof. The various components of a supervisory system 32 may be interconnected via a computer network (e.g., a LAN 42). In selected embodiments, a supervisory system 32 may comprise one or more supervisory servers 34 providing a central repository from which certain data needed by the one or more POS systems 10 or local servers 26 may be stored, indexed, accessed, or the like.

Alternatively, or in addition thereto, a supervisory server 34 may receive and compile (e.g., within one or more associated databases 36) data from the various associated POS systems 10 or local servers 26 to provide or support inventory control, purchasing, receiving and transferring products, or the like. A supervisory server 34 may also receive and compile sales and customer information for reporting purposes, marketing purposes, receivables management, trend analysis, cost analysis, price analysis, profit analysis, or the like.

A supervisory system 32 may be connected to one or more associated locations 22 or branches 22 in via any suitable computer network 44 (e.g., WAN 44). For example, in selected embodiments, one or more locations 22 may connect to a supervisor system 32 via the Internet. Communication over such a network 44 may follow any suitable protocol or security scheme. For example, communication may utilize the File Transfer Protocol (FTP), a virtual private network (VPN), intranet, or the like.

It is thus appreciated that in discussing the functionality of the various POS terminals and servers, the embodiments described herein may be implemented in a system contained within a single location or across multiple locations. By way of example, the functionality accomplished by a server or computer, such as storing, processing, and transmitting/sending receipt information, may be accomplished by a local computer or a remote computer such as servers 26 and 34.

Figure 5:
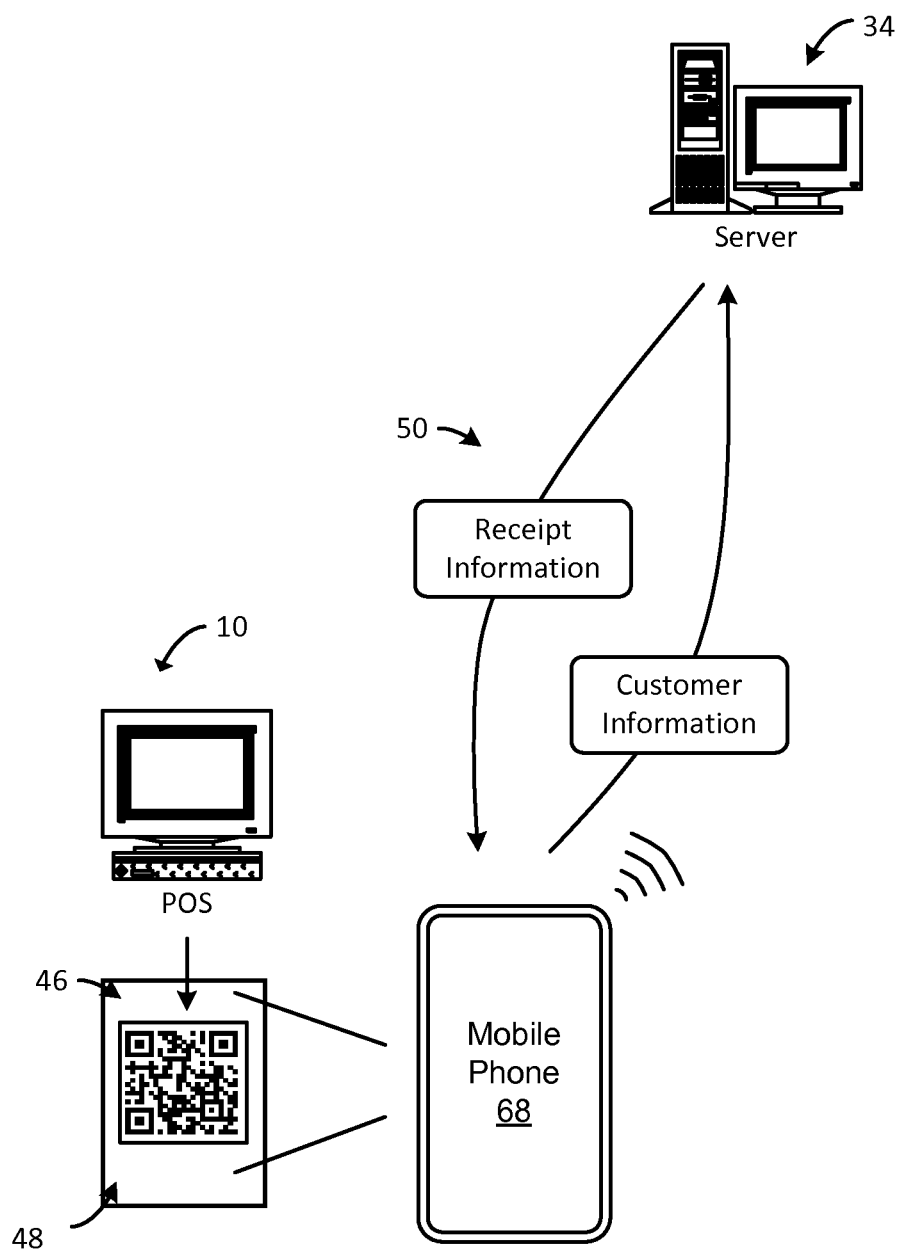
FIG. 5 is a block diagram illustrating the flow of data within one embodiment.

Referring to FIG. 5, a customer may use a mobile electronic device 68 while shopping. The mobile electronic device may be a mobile phone such as a smart phone, a tablet computer, etc. In many instances, the mobile electronic device is a mobile phone 68. The customer may download or may already have downloaded self-checkout software to a mobile electronic device 68. A customer may have previously received a paper receipt 46 or other medium which includes an invitation such as a machine readable code 48 to download and use self-checkout software and may have installed self-checkout software on the mobile electronic device 68.

As indicated at 50, the customer may have created an account with a receipts/shopping server 34 and may transmit information to the server 34. The computer server 34 may likewise transmit information to the mobile device 68. The customer may receive self-checkout software on the mobile device 68 which may enable them to manage their in-store shopping experience with their mobile electronic device. Additionally, the self-checkout software may allow the customer to interact with a POS system 10 via the mobile electronic device 68.

Figure 6:
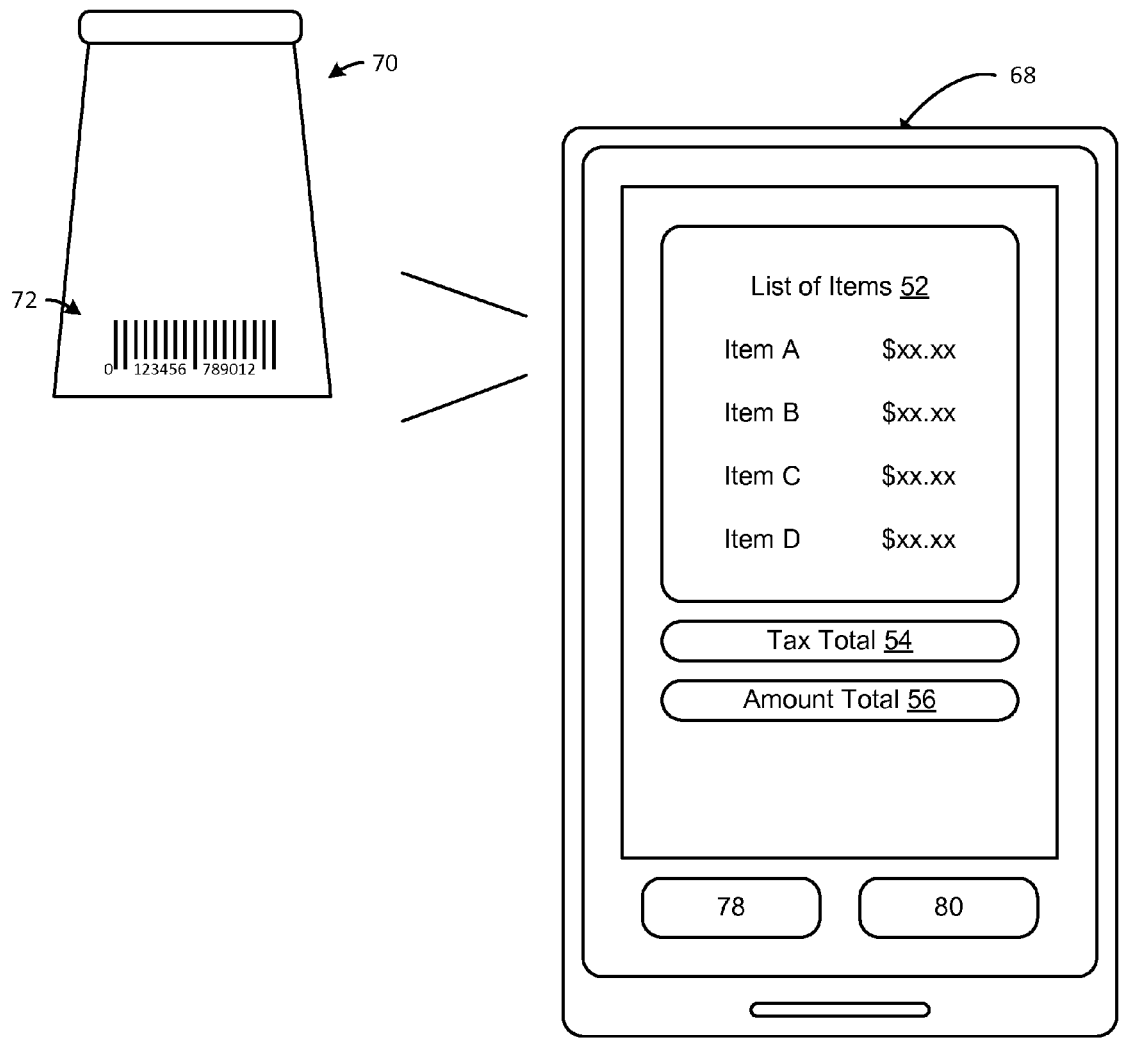
FIG. 6 is a schematic block diagram of one embodiment of a shopping cart or list viewed on a mobile electronic device.
Figure 7:
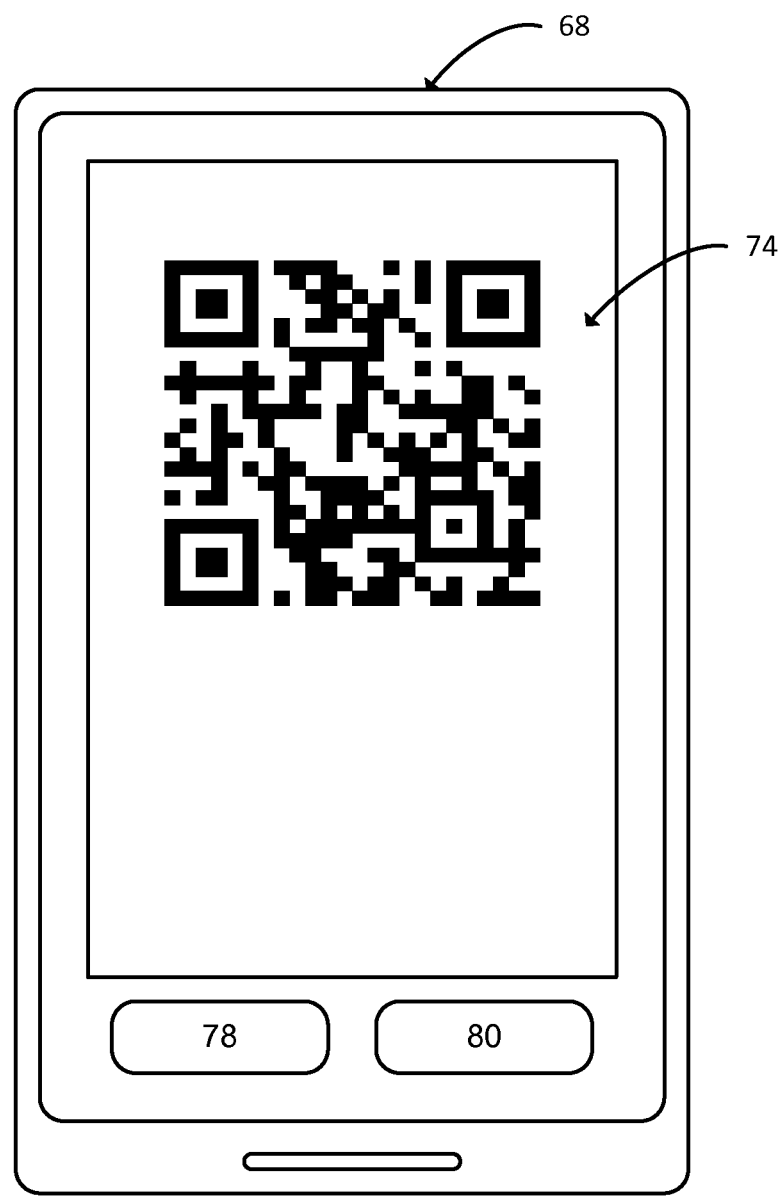
FIG. 7 is a schematic block diagram of one embodiment of a barcode viewed on a mobile electronic device.

Referring to FIG. 6, the customer may use the mobile electronic device 68 while shopping in a brick and mortar store. In particular, the customer may use the mobile electronic device 68 to scan UPC codes 72 on products 70. Mobile self-checkout software loaded onto the mobile electronic device 68 may provide this functionality to the customer. The mobile self-checkout software may utilize a camera on the mobile electronic device to capture UPC codes 72 on products 70 as the customer selects these items for purchase in the store. The mobile self-checkout software may provide a user interface on the device 68 as shown. The software, through the mobile electronic device 68 may display a list 52 of selected items/products 70 to the customer as the customer selects these for purchase.

If desired, the self-checkout software may display the cost of an item next to the item. This may require additional information from the customer or store, as this information may not be conveyed with the UPC code. The software may allow the customer to enter in the price of the item while selecting this item, as well as the quantity of the item which the customer is purchasing. If this information is acquired, the mobile self-checkout software may provide the customer with a tax amount 54 and a purchase total 56 as the customer selects products for purchase. This may assist the customer in completing their purchase.

The mobile self-checkout software may provide virtual buttons 78, 80 on the user interface. By way of example, one virtual button 78 may cause operation of the camera to capture a UPC code 72 on a product 70. Once captured, the software may allow the customer to enter a price and quantity if desired. This may be facilitated through a virtual keypad. Another virtual button 80 may be used by the customer when the customer desired to checkout.

When a customer has finished selecting items for purchase in the store and desires to checkout, they will typically press a button 80 to indicate this on the mobile electronic device 68. This may cause the mobile self-checkout software to prepare the list 52 of selected items for checkout. The software may process information regarding the selected products 70 for transmittal to the POS terminal. Typically, the mobile self-checkout software may provide the UPC code 72 and product purchase quantity to the POS terminal. The software may take the data for the UPC code 72 (such as the numeric equivalent) and item quantity and embed this information within a machine readable code 74 as a payload. The mobile self-checkout software may shorten or append the UPC codes, such as by appending these codes into the last five numbers of the code, allowing for greater information capacity in the machine readable code 74.

The machine-readable code 74 may comprise a two-dimensional barcode. Two-dimensional barcodes may support or provide more data per unit area than can be obtained using a traditional one-dimensional barcode. A two-dimensional barcode may follow any suitable protocol, format, or system. In selected embodiments, a two-dimensional code may be embodied as a Quick Response (QR) Code or a High Capacity Color Barcode. A single such code 74 may convey UPC and quantity information for several products to the POS terminal.

Figure 8:
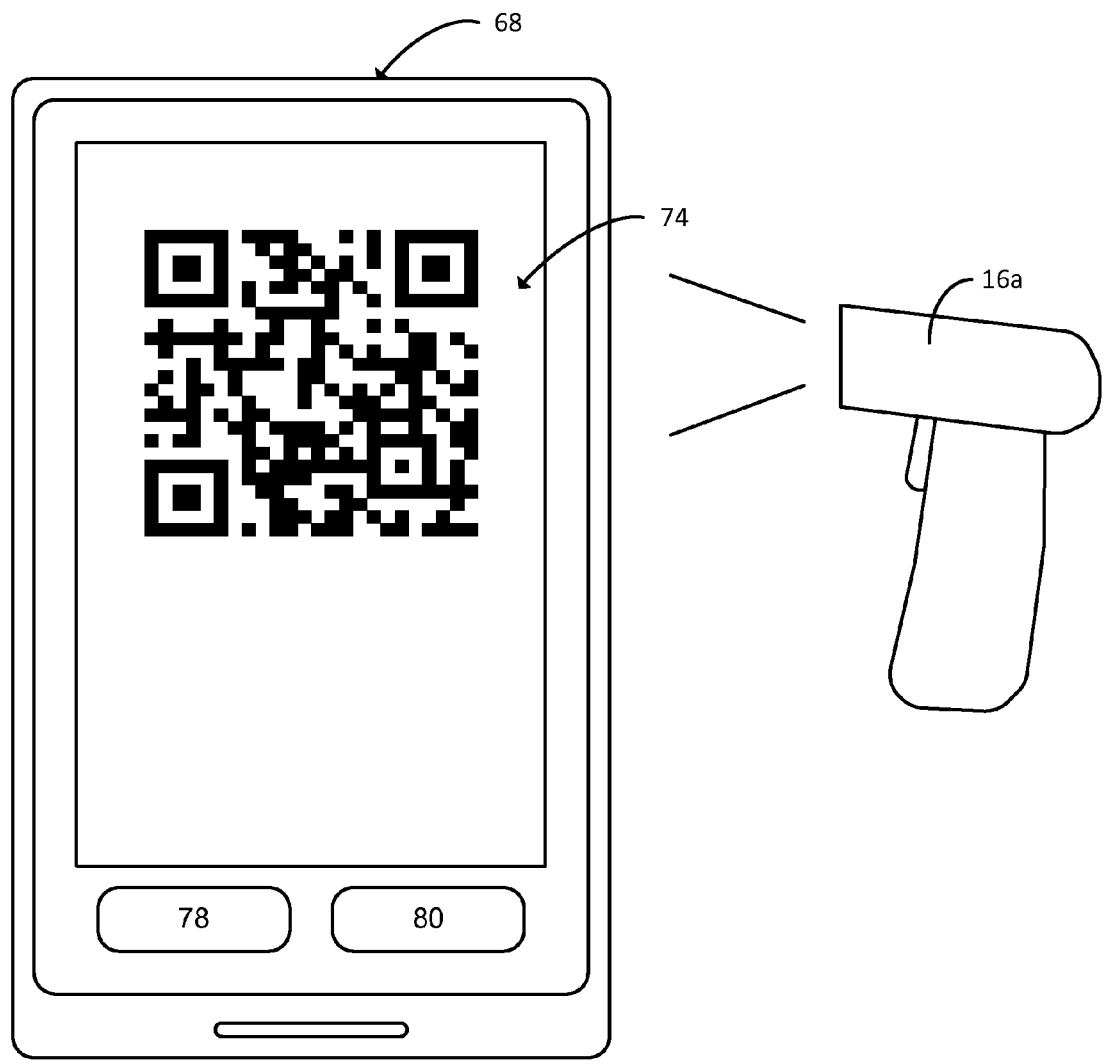
FIG. 8 is a schematic block diagram of one embodiment of a barcode scanned from a mobile electronic device at a POS terminal.

As indicated in FIG. 8, an optical scanner 16a at a POS terminal 10 (not shown for clarity) may be used to capture the machine readable code 74 produced on the mobile electronic device 68 and thus acquire UPC and/or product quantity information for the POS terminal. It will be appreciated that the optical scanner 16a may differ according to the POS terminal. For example, in a self-checkout lane the customer may use an optical barcode scanner which is integrated into the POS terminal to capture the machine readable code 74. At a conventional checkout lane with a sales associate operating a POS terminal, the sales associate may use a handheld scanner 16a to capture the machine readable codes 74 from the mobile electronic device.

In some cases, the customer may have selected a greater number of products than can be carried within a single machine readable code 74. In this situation, the software can create a sequence of multiple different machine readable codes 74. These machine readable codes 74 are displayed sequentially on the mobile electronic device 68 and captured by the scanner 16a. Where multiple machine readable codes 74 are prepared by the mobile self-checkout software, the first code 74 may identify itself as the first and the sequence may be quickly flashed (cycled) to the scanner as the scanner reads the multiple codes 74. If desired, each machine readable code 74 in the sequence can identify itself (1/4), (2/4), etc.

Alternatively, the first machine readable code 74 may indicate that it is number (1/4) and may provide a checksum for the whole payload. These pieces of data in the machine readable codes allow the POS terminal to determine if it received the entire series of machine readable codes 74. Some 2D barcodes have redundancy for error correction. If desired, the self-checkout software may lower the amount of redundancy checks to increase the payload data in the code.

While scanning the machine readable codes, the scanner 16a or POS terminal 10 can indicate, such as with a beep, after receiving the machine readable codes 74. The scanner 16a or POS terminal 10 may indicate if the receipt is successful or not successful, such as with a beep. The scanner 16a or POS terminal 10 may timeout if data is not received. The scanner 16a can operate for a fixed time period to acquire the machine readable codes.

In this manner, the information regarding the customer's selected products, such as UPC codes and quantity, may be provided from the mobile electronic device 68 to the POS terminal 10 without the use of any network connection or data connection between these devices. This is highly advantageous as the customer is not guaranteed to have a network connection to their mobile electronic device 68 and facilitating a successful transfer of the desired data will promote customer satisfaction.

Figure 9:
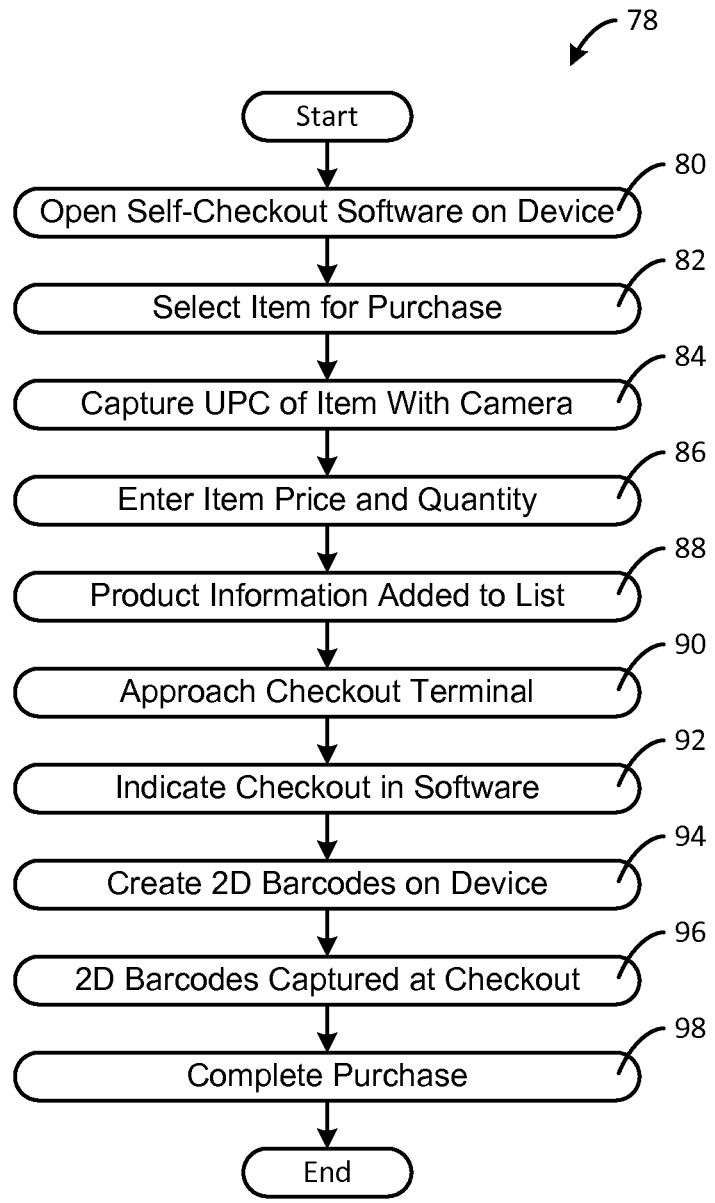
FIG. 9 is a block diagram of one embodiment of a method for transferring a shopping cart or list.

FIG. 9 generally illustrates a process 78 which may be used to build a shopping cart on a mobile electronic device 68 while a customer is in a brick and mortar store shopping and then transfer the shopping cart to a POS terminal 10. Generally, a person will first operate 80 mobile self-checkout software on a mobile electronic device 68. The customer may then select 82 an item 70 for purchase while shopping at a local brick and mortar store. The customer may then capture 84 the product UPC code 72 with a camera on the mobile electronic device 68, typically using the self-checkout software. If desired, the customer may enter 86 price and quantity information for the product into the mobile electronic device using the self-checkout software. The product information may then be added 88 to a list 52 of items selected for purchase.

The customer may desire to purchase more items, and may continue to select items as discussed above to build the list 52, or shopping cart, of items for purchase. When the customer is finished selecting items for purchase, the customer will typically approach 90 a POS terminal 10 with the items that the customer will purchase. The customer may indicate 92 in the self-checkout software on the mobile electronic device 68 that they are ready to checkout. The self-checkout software may then create 94 one or more machine readable codes 74 such as 2D barcodes on the mobile electronic device. The machine readable codes 74 bearing the UPC codes and possible other product information are then displayed 96 on the mobile electronic device 68 and captured 98 by an optical scanner at the POS terminal 10. The customer will then typically complete the purchase transaction 98 and receive a receipt.

Figure 10:
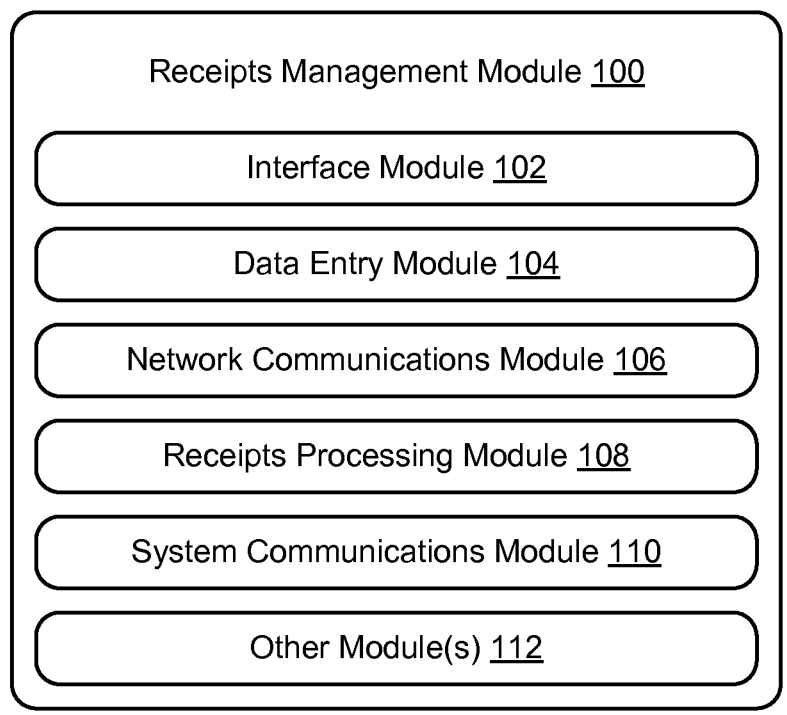
FIG. 10 is a schematic block diagram of one embodiment of a list sharing module.

Referring now to FIG. 10, a computer system may include a self-checkout module 100. The various functions or modules of a self-checkout module 100 may be enacted or implemented by any suitable system or component thereof. For example, in selected embodiments, one or more functions or modules of a self-checkout module 100 may be distributed across one or more hardware devices, including a mobile electronic device 68, a primary computer 12 of a POS system 10, a local server 26, a supervisory server 34, some other onsite resource, some other offsite resource, or the like or combinations or sub-combinations thereof. Thus, different embodiments may be adapted to a wide variety of situations, including more rigid legacy systems.

In selected embodiments, a self-checkout module 100 facilitates the shopping and checkout process described herein. The self-checkout module may include any suitable arrangement of sub-components or modules. The self-checkout module 100 may include an interface module 102 which interfaces with a customer. The interface module may include a display on a mobile electronic device 68. The self-checkout module 100 may also include a data entry module 104 which may include a keypad or touchscreen on a mobile electronic device 68 and camera on a mobile electronic device 68 and which allows the customer to enter data associated with a particular product, such as a product for purchase.

The self-checkout module 100 may include a data presentation module 106 which may present shopping cart data to a POS terminal 10 via the mobile electronic device 68. Such a data presentation module may create one or more 2D barcodes and present these on a mobile electronic device screen as discussed herein. The self-checkout module 100 may also include a data acquisition module 108 which may include a scanner 16a as part of a POS terminal and which may facilitate the receipt of shopping cart information from the mobile electronic device by a POS terminal 10. The self-checkout module 100 may include a system communications module 110 which may communicate between a server 26, 34, a POS terminal 10, and/or a mobile electronic device 68 as may be desired. The self-checkout module 100 may also include other modules 112 as are desirable to implement various embodiments. The various modules and parts of the mobile self-checkout module 136 may include hardware, firmware and software components as are desirable for various embodiments and to achieve the various steps, features, and functionality discussed herein.

The flowchart and block diagrams of the Figures illustrate the architecture, functionality, and operation of possible implementations of systems, methods, and computer program products according to one or more embodiments. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

It should also be noted that, in some alternative implementations, the functions noted in the blocks may occur out of the order noted in the Figure. In certain embodiments, two blocks shown in succession may, in fact, be executed substantially concurrently, or the blocks may sometimes be executed in the reverse order, depending upon the functionality involved. Alternatively, certain steps or functions may be omitted if not needed.

The invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

The invention claimed is:

1. A method for transmitting item information from a mobile electronic device and a checkout register comprising:
    capturing a UPC code from a plurality of items into self-checkout software on a mobile electronic device;
    receiving item information into the self-checkout software on the mobile electronic device for each of the plurality of items;
    embedding the item information into a plurality of machine readable codes, each machine readable code containing information for a plurality of the items and including a total number of machine readable codes and a sequence number of the machine readable code within the total number of machine readable codes;
    displaying the machine readable codes on the mobile electronic device;
    scanning the machine readable codes with a scanner at a checkout register; and
    receiving the item information into the checkout register from the machine readable codes.

2. The method of claim 1, wherein the method more specifically comprises capturing a UPC code from an item using a camera on a mobile electronic device.

3. The method of claim 1, wherein the item information comprises at least a part of the UPC code from the item.

4. The method of claim 3, wherein the item information further comprises a quantity of the item for purchase.

5. The method of claim of claim 1, wherein each machine readable code comprises a 2D barcode.

6. The method of claim 1, wherein the plurality of codes are indexed to verify that each of the plurality of codes is scanned by the scanner.

7. The method of claim 1, wherein at least one of the plurality of codes has a checksum to verify that each of the plurality of codes is scanned by the scanner.

8. A method for transmitting item information from a mobile electronic device and a checkout register comprising:
    for each of a plurality of items at a brick and mortar store:
        capturing a UPC code from an item with self-checkout software on a mobile electronic device;

receiving item information into the self-checkout software on the mobile electronic device;

embedding the item information for the plurality of items into a plurality of two dimensional barcodes, each barcode containing information for a plurality of the items and including a total number of barcodes and a sequence number of the barcode within the total number of barcodes;

displaying the barcodes on the mobile electronic device;

scanning the barcodes with a scanner at a checkout register; and receiving the item information into the checkout register from the barcodes.

9. The method of claim 8, wherein the item information includes at least a portion of the UPC code for each of the plurality of items.

10. The method of claim 9, wherein the item information includes item quantity information.

11. The method of claim 8, wherein the method more specifically comprises embedding the item information for the plurality of items into multiple two dimensional barcodes.

12. The method of claim 11, wherein the method more specifically comprises displaying the multiple barcodes in a sequence on the mobile electronic device.

13. A method for transmitting information from a mobile electronic device and a checkout register comprising:

receiving a list of items for purchase at a brick and mortar store into self-checkout software on a mobile electronic device;

creating a plurality of two dimensional barcodes on the mobile electronic device, each barcode having item information for the list of items embedded therein and including a total number of barcodes and a sequence number of the barcode within the total number of barcodes;

displaying the barcodes on the mobile electronic device;

scanning the barcodes with a scanner at a checkout terminal at the store to thereby receive the item information into the checkout terminal.

14. The method of claim 13, wherein the method comprises capturing UPC codes from items at a brick and mortar store into self-checkout software.

15. The method of claim 13, wherein the method more specifically comprises creating multiple two dimensional barcodes, each barcode having item information for multiple items embedded therein, and displaying the barcodes in sequence on the mobile electronic device.

\* \* \* \* \*